Patented Jan 6, 1953

2,624,698

UNITED STATES PATENT OFFICE 2,624,698

METHOD OF PRODUCING A PURIFIED COKE

John H. Hickey, Morton Grove, Ill., assignor to Great Lakes Carbon Corporation, Morton Grove, Ill., a corporation of Delaware No Drawing. Application September 8, 1947, Serial No. 772,882

9 Claims. (Cl. 202—25)

This invention relates to a method for preparing coal for use in the manufacture of electrodes and the like. More particularly it relates to a method for removing certain undesirable constituents that appear in minute amounts in coal even after the coal has been subjected to the most efficient beneficiation by mechanical methods and at the same time putting it in condition for coking under controlled conditions to produce refractory carbon.

Coal as it occurs contains more or less of mineral inorganic constituents of various kinds. Some of these appear as inclusions of sufficient size that they can be sorted out by hand or by water washing, or by gravity or froth flotation. The various coals thus treated vary in ultimate ash content over a comparatively wide range. If coal is ground to a fine mesh size and subjected to gravity or froth flotation, it is possible to remove the larger portion of these ash constituents but it is impossible to remove them all. Coke having a high ash content has limited utility as a constituent of carbon electrodes, metallurgical coke, graphite, etc. This appears to bear no particular relationship to the ash content as such, except where some one ash constituent is of itself objectionable, but the actual properties of the finished product are sometimes good and sometimes not.

I have developed a process for the substantially complete removal of certain objectionable constituents from coal and similar organic substances and at the same time have improved the properties of the coke obtainable from the treated coal. Among the materials which may be removed substantially completely is silica although other objectionable constituents may also be removed in greater or lesser amount according to this invention. It has been found that the benefit derived by the coal for certain uses such as in the manufacture of carbon electrodes and metallurgical coke is improved over and above what would be expected merely from the removal of the silica. For many purposes the minor amounts of silica remaining after mechanical beneficiation is not objectionable but in the production of carbon electrodes, metallurgical coke, and the like, it has been found that products containing even a few tenths of a per cent of silica are objectionable and often cannot be used. It is an object therefore of this invention to make available carbonaceous materials for the manufacture of carbon electrodes such as those used in the manufacture of aluminum and magnesium wherein the presence of silica and certain other impurities is detrimental.

The reagents which I use in this process are termed "volatilizable fluorides." The term "volatilizable fluoride" as used herein includes those fluorides which are volatile below about 400° C. exclusive of the fluorides of silicon.

The volatile fluorine compounds which may be used in the present invention comprise ammonium bifluoride, ammonium fluoride, hydrogen fluoride and mixtures of hydrogen fluoride with ammonia. Other volatile fluorine compounds capable of decomposing at the temperature at which the heating occurs may be employed. These include certain organic fluorine compounds and the hydrogen fluoride salts of certain compounds particularly organic bases such as the nitrogen bases, including pyridines, methyl amine, and the like.

The process has a number of advantages. Aqueous solutions of corrosive fluorides are not used, thus eliminating many of the problems of contacting, separating, washing and drying large quantities of material which such processes require. The coal has superior carbonizing properties after my treatment over processes using aqueous solutions or non-volatile treating agents. The unconsumed treating agent of this invention is readily recovered and recycled. Also the products such as fluorides of silicon can be reconverted into active treating agent by known methods. In addition, removal of impurities such as silica is substantially complete with this process.

In one specific embodiment the invention relates to a process for treating coal as a step in a process for producing useful carbonaceous products therefrom such as the production of carbon electrodes, which comprises crushing the coal to a mesh size of approximately 10 mesh or smaller, reducing the inorganic mineral content of said coal by means of mechanical methods, subjecting the partially purified coal to the action of a volatile compound of fluorine at a temperature below that at which the coal becomes plastic but at a temperature at which the volatile silicon compounds formed will be driven off, for substantially complete removal of the silicon present.

The charging stock which may be used includes bituminous coals of a coking and non-coking nature, anthracite, and the like. Under certain conditions materials such as peat, lignite, oil shales, natural pitches and asphalts, and tar sands may be treated.

The exact procedural steps employed will depend to a large extent upon the character of the fluorine compound used. For example, when treating coal with hydrogen fluoride it has been my custom to preheat the coal to the reaction temperature in the range of about 250–400° C. and then add the hydrogen fluoride over a period of time in such a manner that it comes thoroughly into contact with the heated coal. Care must be taken that the coal is not allowed to reach a temperature in excess of about 400–500° C., otherwise carbonization begins to occur. The coking coals begin to swell and coalesce before they have received sufficient treatment to reduce the ash content and particularly the silica content below the desired amount. If the temperature reaches the point at which the coal begins to become plastic before the treatment is complete, the resultant product cannot be adequately treated to obtain the desired result even by long and extended treatment.

When treating with hydrogen fluoride, it is essential that the coal be preheated above 250° C. before adding the hydrogen fluoride. It has been found in this way that more silica is removed and that the residue retains less fluorine than if treatment were made below 250° C.

When employing ammonium fluoride or ammonium bifluoride, the manner of handling the coal and treating it may be somewhat different. In addition to heating the coal and then adding the ammonium fluoride, it is possible to mix the ammonium fluoride or bifluoride with the coal in powdered form and then heat the mixture. This appears to be to some extent a matter of convenience although with certain types of coal one procedure may be substantially better than the other.

When treating coking coals and particularly those having relatively high volatile content, improved results are obtained if the heating is carried out under superimposed pressure or under the vapor pressure of the treating agent at the operating conditions. With this type of coal and when using a pressurized system, temperatures may be used in the range of about 100° C. to 400° C., the upper limit depending on the plasticizing temperature. Preferably the temperature is kept at a minimum in order to obtain the results desired.

The process is in effect a two stage operation in which the coal and fluorine compound is heated in a primary stage at a relatively low temperature of about 150° C. to 250° C. and is then subjected to a high temperature treatment at about 350° C. to 400° C. to volatilize fluorides of silicon, the remaining unchanged reagent and any ammonium salts which may have been formed during the course of the treatment. The volatilization step should also be carried out below the temperature at which the coal becomes plastic, since this appears to be a critical condition to the most successful treatment of the coal.

For low volatile coals, it is possible to gradually heat the coal up to about 400° C. at about atmospheric pressure although higher temperatures can be obtained particularly if extreme care is taken to prevent overheating of small portions of the coal at some point in the apparatus and to bring the treating and vaporizing steps to completion before the coal becomes plastic.

The non-coking coals generally do not coalesce to any substantial extent without being heated to a temperature high enough to carbonize them. The non-coking coals may be ground to a fine state of sub-division, treated mechanically to remove most of the ash and then treated at the lower temperatures described with one of the volatile fluorine compounds disclosed herein, under the described conditions, and finally heated to a temperature sufficiently high to drive off any volatile fluorides formed without special regard as to whether the coal is destructively distilled or not.

The non-coking coals can be treated as described above, below the temperature of destructive distillation, and then mixed with a binder, either hot or cold, and carbonized to put it in proper form for subsequent use.

On the other hand ground coking coal when treated below the point at which the mass becomes plastic can be purified and then upon heating to a temperature above that at which it cokes, may be made to coalesce forming particles of the size most desirable in electrode manufacture.

Coking and non-coking coals are not exactly equivalent in this process. Due to the tendency of the former to fuse together at higher temperatures, larger particles are formed during coking which is desirable when the coke is to be used in electrode manufacture. It is an advantage to be able to grind the coal to pass for example a 60 mesh screen or finer in view of the fact that the purification such as silica removal is substantially improved by this procedure. With coking coals, the subsequent coking steps causes the particles to coalesce, and they are readily coked under conditions to produce coke of the most desirable physical properties.

The apparatus may comprise various types of kilns known to the industry; they include the so-called fluidized flow of solids, and other suitable methods. The unreacted reagent may be recovered substantially completely. One method of accomplishing this is to pass the coal in the form of fine particles through a treating zone. The moving coal which may be "fluidized" by passing countercurrently thereto the vapors of the volatile fluoride together with an inert gas sufficient to induce fluidizing of the particles. In a moving bed operation coal granules may be continuously fed downwardly through a heated zone. Hydrogen fluoride, ammonium fluoride or ammonium bifluoride vapors may be introduced into the moving bed. When ammonium fluoride or bifluoride is used, it may be mixed directly with the coal before heating.

The proportion of the volatile fluoride to the raw coal depends to a large extent upon the impurities present which may be removed as volatile compounds. When removing silica only, the proportion of volatile fluoride is in excess of the amount required stoichiometrically to react with the silica present. In general, at least two times the stoichiometric amount of fluorine is used and it is preferably in the range of about 2 to 5 times that required to react with all of the silica. This proportion will depend to some extent upon the mode of operation. For example, when using a batch operation, a larger quantity of active fluorine is required than when using a continuous countercurrent method. In the countercurrent method the amount of volatile fluoride required may be as low as about 1.5 times the equivalent of the impurities with which the fluorine reacts.

In general the pressure applied to the system during the soaking period is slightly above atmospheric and this may be obtained by allowing the system to reach the pressure attainable due to the vapor pressure of the volatile reagent or may be obtained by superimposing pressure of an inert gas.

The time factor for the soaking step depends to some extent upon the coal. For high volatile coals it is preferred to use a soaking period in a closed system up to as much as five hours. Low volatile coals can be heated gradually in an open system to the temperature at which the volatile silicates and the reagent will volatilize. Intermediate time periods will be used for coals of intermediate volatility.

In general when employing pressure, the time factor may range from the period of time that is required to heat the mixtures up to the point at which the maximum vapor pressure effect of the reagent is observed, to a period of about 1 to 2 hours depending upon the temperature and how much volatile matter is present in the coal. For practical purposes the temperature and time at as low a value as possible to obtain the results will be used.

In the second step during which the volatile treating agent and the volatile reaction constituents are removed by distillation, the pressure may be atmospheric but is preferably subatmospheric in order to be sure that substantially all of the volatile compounds are removed. Instead of a vacuum and in certain cases supplementing it, an inert sweep gas may be passed through the treated coal to assist in the removal of the last traces of fluorine.

If an extraneous gas is employed, it should preferably be one which is unreactive with any or all of the constituents at operating conditions and it should be a non-oxidizing gas. Nitrogen, carbon dioxide, and flue gas substantially free of oxygen are examples of this. Carbon monoxide, water gas or natural gas may also be used. Oxygen is generally objectionable in that it tends to impair the coking properties of the coal and it has been found advantageous to maintain a reducing atmosphere around the coal during treatment except that in some instances a limited and carefully controlled extent of oxidation may be beneficial.

The particle size of the coal may range from approximately 0.25 inch to finely divided particles passing a 300 mesh sieve. The smaller sizes favor more ready removal of impurities and the end result is one of greater removal of silica and in general, less consumption of time. When employing coking coals which will coalesce during the coking step, the fine particle sizes are preferred. For reasons of economy, coal passing a 10 to 100 mesh is effective although for my purpose it may be crushed to pass for example a 60 mesh screen. Conditions of treatment should be such as to permit the volatile fluoride to penetrate the particles and permeate them to assure the maximum beneficial effect.

The rate of temperature rise following the first step may be varied over a wide range but a rate of about 60° C. to 80° C. per hour has been found to be satisfactory when using conventional coke oven apparatus. The temperature should be held below the decomposition temperature of the coal throughout the volatilization step. It may then be increased to coke the coal, particularly when the treatment and coking are carried out in the same apparatus.

Either ammonium bifluoride or ammonium fluoride is suitable but the bifluoride is preferred. Under the condition of treatment, an ammoniosilico fluoride is formed in the first step and volatilized in the second step. This may be decomposed to liberate hydrogen fluoride which is used again in the preparation of ammonium bifluoride.

When employing HF, the product is $SiF_4$. This can be converted into $(NH_4)_2SiF_6$ by adding ammonia and this disposed of as indicated in the above paragraph.

A gaseous mixture containing approximately 2 moles of hydrogen fluoride and 0-1 mole of ammonia which are mixed and passed into contact with the heated coal may be used. The presence of some $NH_3$ is beneficial in that more or less of the iron present in the coal is rendered water soluble and can be subsequently leached out by water or dilute acids.

Example I

A bituminous coal from Alabama was crushed to pass a 10 Tyler mesh screen, and then gravity floated with an aqueous calcium chloride solution, specific gravity 1.30. The washed and air dried floated coal analyzed 0.16% silicon and 0.94% total ash. The floated coal was washed with water containing small amounts of sodium carbonate and ethyl xanthate to remove adhering slimes and was then "wet and dry" screened to obtain several fractions, each differing in particle size range. After drying, 100 weight parts of each fraction was mixed with 3 weight parts ammonium bifluoride, equivalent to 3.1 times the stoichiometric proportion of silicon present in the coal. Each mixture was charged to a closed stainless steel reactor and allowed to soak at 250° C. for one hour, after which the volatile products were distilled out under slight vacuum while heating to 410° C. during four hours. Yields of non-coked products were approximately 86% of the coal charged. The effect of particles size on removal of silicon is shown in the following tabulation:

| Coal Fractions Tyler Mesh | Si Remaining, Percent Air Dried Coal |
|---|---|
| 10/14 | 0.018 |
| 14/20 | 0.016 |
| 28/35 | 0.014 |
| 250/325 | 0.004 |
| −325 | 0.002 |

Example II

One hundred gram portions of the gravity floated bituminous coal of Example I containing 0.16% silicon and 0.94% total ash, air-dried basis, were mixed with 1, 2, 3, 5 and 10 grams ammonium bifluoride respectively. Each mixture was held at 240°–260° C. in a closed wrought iron reactor for one hour, after which the reactor was opened and volatile products were distilled out by raising the temperature to 510° C. during three hours. All the products were hard dense cokes containing about 10% volatile hydrocarbon matter; the yields of coke were approximately 71% of the coal charged. The ash and silicon remaining in the product are given in the following tabulation expressed as per cent of air-dried coal charged.

| Grams $NH_4HF_2$ per 100 grams coal | Percent Total Ash | Percent Si |
|---|---|---|
| 1 | 0.77 | 0.085 |
| 2 | 0.64 | 0.015 |
| 3 | 0.65 | 0.013 |
| 5 | 0.65 | 0.013 |
| 10 | 0.64 | 0.006 |

Example III

A gravity floated bituminous coal (Bell Coal Co., Rella, Kentucky) was dry crushed to pass a 60 Tyler mesh sieve. The floated coal contained 0.11% silicon. With 100 parts by weight of this coal was mixed 3 parts by weight of powdered ammonium bifluoride equivalent to 4.5 times the stoichiometric proportion of silicon present. The mixture was heated during one hour to 255° C. in a closed stainless steel reactor and held at this temperature for one hour more, after which the volatile products were distilled out under slight vacuum while the temperature was raised to 390° C. during 3.5 hours. A 91% yield of a non-coked product was obtained containing less than 0.01% silicon.

*Example IV*

An anthracite coal (Jeddo, barley size) was crushed to pass a 10 Tyler mesh sieve and gravity floated in a CCl$_4$–CHBr$_3$ medium, specific gravity 1.65. The dried, floated coal contained 0.75% silicon and 4.38% total ash. With 100 parts by weight of the floated coal was mixed 15 parts by weight of powdered ammonium bifluoride equivalent to 3.3 times the stoichiometric proportions of silicon present and the mixture was heated in a stainless steel reactor during 3.6 hours to 410° C. for the purpose of distilling out the volatile reaction products. A 99% yield of coal product containing 0.03% silicon was obtained.

*Example V*

A low volatile bituminous coal (Peerless Mine, West Virginia) containing 0.77% silicon and 5.0% total ash, basis air-dried coal, was ground to pass a 60 Tyler mesh sieve. With 100 grams of the crushed coal was mixed 10 grams powdered ammonium fluoride equivalent to 1.6 times the stoichiometric amount of silicon present. Volatile products were distilled out of the mixture at atmospheric pressure by heating it to 500° C. during 4 hours in a wrought iron reactor. The distillate contained all of the silicon from the coal except less than 0.01% remaining in the coal product. The product amounted to 93% of the coal charged and after water leaching contained 2.9% total ash. No ammonium silico fluoride which is water soluble as well as volatile was found in the water leaching, hence it had distilled out during the heat treatment.

I claim as my invention:

1. A process for manufacturing a purified coke suitable for carbon electrode manufacture which comprises crushing to fine particles a bituminous coal containing silicon impurities and which becomes plastic upon heating to high temperatures, separating mineral impurities therefrom by physical methods, heating the comminuted particles with a volatile fluoride at a temperature above 100° C. and in any event above the vaporization point of said fluoride but below the temperature at which the coal becomes plastic thereby reacting the fluoride with the silicon impurities remaining in the particles and removing the resulting silicon fluorides by volatilization at a temperature below that at which the coal becomes plastic and finally coking the purified particles thereby coalescing them.

2. The process of claim 1 wherein the volatile fluoride is selected from the group consisting of hydrogen fluoride, ammonium fluoride, ammonium bifluoride, and mixtures of the same.

3. The process of claim 1 wherein the amount of said fluoride is about 2 to about 5 times the stoichiometric equivalent of the silica content of said coal.

4. The process of claim 1 wherein the temperature is in the range of about 100° to about 400° C.

5. The process of claim 1 wherein the coal is first heated with said fluoride at about 150° to about 250° C. and the silicon fluorides are then volatilized at about 350° to about 400° C.

6. A process for purifying comminuted bituminous coal containing silicon impurities which comprises heating the coal in a first step in the presence of a volatilizable fluoride at a temperature of about 100° C. to about 400° C. under a pressure at least equal to the vapor pressure of the fluoride to react the fluoride with the silicon impurities, then in a second step reducing the pressure and removing volatile silicon fluorides and unconsumed fluoride from the coal by volatilization, the temperature at all times being maintained below that at which said coal becomes plastic.

7. The process of claim 6 wherein the coal is heated in the first step at about 150° to about 250° C. and in the second step at about 350° to about 400° C.

8. A process for purifying a coal containing silicon impurities and which becomes plastic upon heating to high temperatures which comprises heating the comminuted coal with a volatile fluoride at a temperature above 100° C. and in any event above the vaporization point of said fluoride, but below the temperature at which the coal becomes plastic, thereby reacting the fluoride with the silicon impurities and removing the resulting silicon fluorides by volatilization at a temperature below that at which the coal becomes plastic.

9. A process for manufacturing a purified coke suitable for carbon electrode manufacture which comprises crushing to fine particles a bituminous coal containing silicon impurities and which becomes plastic upon heating to high temperatures, separating mineral impurities therefrom by flotation in a liquid medium, washing the occluded liquid medium from the partially purified coal and drying it, thereafter heating the partially purified particles with a volatile fluoride at a temperature above 100° C. and in any event above the vaporization point of said fluoride but below the temperature at which the coal becomes plastic thereby reacting the fluoride with the silicon impurities remaining in the particles, removing the resulting silicon fluorides by volatilization at a temperature below that at which the coal becomes plastic and finally coking the purified particles thereby coalescing them.

JOHN H. HICKEY.

REFERENCES CITED

The following references are of record in the file of this patent:

UNITED STATES PATENTS

| Number | Name | Date |
|---|---|---|
| 733,389 | Hall | July 14, 1903 |
| 1,303,362 | Matt | May 13, 1919 |
| 1,380,458 | Woodruff et al. | June 7, 1921 |
| 1,517,819 | Beer | Dec. 2, 1924 |
| 1,911,004 | Svendsen | May 23, 1933 |
| 2,315,346 | Mitchell | Mar. 30, 1943 |

FOREIGN PATENTS

| Number | Country | Date |
|---|---|---|
| 412,209 | Great Britain | June 18, 1934 |

OTHER REFERENCES

Mantell, Industrial Carbon (second ed.), pages 217–218, 1946.